May 28, 1929.  B. H. URSCHEL  1,714,742
LUBRICANT SEAL FOR UNIVERSAL BOOTS
Filed Sept. 10, 1926
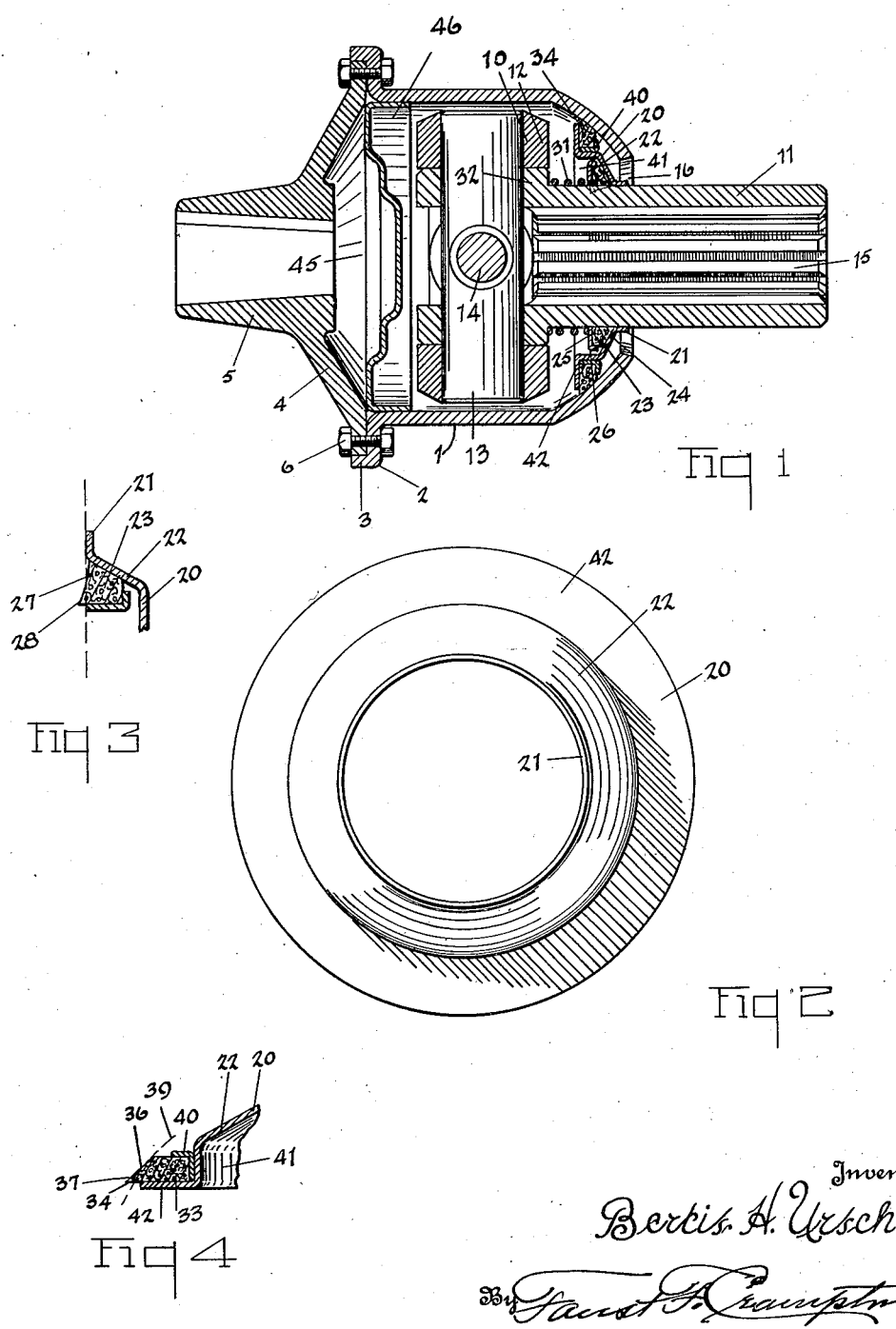

Patented May 28, 1929.

1,714,742

UNITED STATES PATENT OFFICE.

BERTIS H. URSCHEL, OF BOWLING GREEN, OHIO, ASSIGNOR TO URSCHEL ENGINEERING COMPANY, OF BOWLING GREEN, OHIO, A CORPORATION OF OHIO.

LUBRICANT SEAL FOR UNIVERSAL BOOTS.

Application filed September 10, 1926. Serial No. 134,661.

My invention has for its object to produce an efficient lubricant seal for boots of universal joints. Because of the required oscillatory movement of the telescoping shaft which together with the universal joint is lubricated by a lubricant contained in the boot, it has been found difficult to retain the lubricant within the boot and many forms of seals have been provided to prevent the lubricant from working down along the outside of the shaft which results in the early depletion of the lubricant in the boot and causes the lubricant to be thrown centrifugally in all directions from the shaft. The invention provides an annular closing plate that moves with the shaft relative to the boot and closes the opening in the boot between the shaft and the edge of the boot and a pair of washers or gaskets for sealing as against leakage of the lubricant along the inner and outer edges of the plate, that is, as between the plate and the boot and between the plate and the shaft.

The invention may be contained in assembled parts that vary in their details of structure and form. To illustrate a practical application of the invention I have selected a construction containing the invention as illustrative of different devices in which my invention may be utilized and shall describe it hereinafter. The construction selected is shown in the accompanying drawings.

Figure 1 of the drawings illustrates a longitudinal section through the boot and one part of the telescoping shaft. It also illustrates parts of the universal joint. Fig. 2 illustrates a top view of the annular closing plate. Fig. 3 is a view of a section of one of the cork washers showing the relation of its surfaces to each other before the cork washer is secured in position. Fig. 4 illustrates a similar view of the other of the cork washers.

In the form of construction shown in the drawings the boot 1 is provided with a connecting flange 2 that extends laterally and then cylindrically as at 3, and so as to receive the flange 4 which is connected to the driving shaft of the machine. The drive shaft is connected to a suitable hub 5 formed integral with the flange 4. The laterally extending portion of the flange 2 provides means whereby the parts of the boot may be connected together by means of the bolts 6.

The boot is connected to the telescoping shaft through the universal joint 10. The sleeve member 11 is likewise connected to the the boot through the universal joint 10. The universal joint 10 may be of any well known type it being provided with the usual ring 12 and the cross pins 13 and 14. The sleeve 11 is also splined as at 15 that registers in the grooves of the other member of the telescoping shaft in the manner well known in the art. The universal joint 10 and the registering splines of the two parts of the telescoping shaft are lubricated by oil or grease which is inserted in the boot 1. The boot 1 is necessarily provided with a relatively large opening 16 in which the sleeve 11 is located. The opening 16 is larger than the size of the sleeve 11 in order to permit the angular movements of the sleeve 11 relative to the boot. In order to prevent the escape of the lubricant from the boot through the opening 16, usually a pair of lenticular disks fitting the exterior of the sleeve 11 is located, one on the outside and the other on the inside of the boot, means being provided for pressing fibrous washers located at the outer edges of the lenticular members against the inner and outer surfaces of the boot and yet notwithstanding the arrangement, lubricant works its way past the sealing disks until the boot is practically "dry".

By my invention I have provided a means which effectually prevents the lubricant from draining from the boot. A sealing annular plate 20 is located within the boot. It has a cylindrical portion 21 that tightly fits the sleeve 11. The plate 20 also is provided with a conical portion 22 that extends from the cylindrical flange 21 and a cork washer 23, that has a conical surface 24 substantially fitting the conical surface located on the inside of the conical portion 22 of the plate 20. A flanged ring 25 is made so that its inner diameter is slightly smaller than the diameter of the sleeve 11 and substantially the same as the inner diameter of the washer 23. When, therefore, the washer 23 and the ring 25 is forced over the sleeve 11 the ring 25 is stretched and the washer is clamped between a flange 26 formed on the ring 25 and the cylindrical surface of the sleeve 11 which tightly presses the washer against the sleeve 11. Also the washer 23 is formed so as to have a conical surface 27 and when it is clamped by the flange 26 of the ring 25 against the cylindrical surface of the sleeve 11 the lower edge of the conical surface 27 of the washer is compressed until the surface 27 is forced to become cylindrical and conform to the surface of the sleeve 11. This operates to prevent any oil from slipping along the sleeve 11 and if the washer 23 should come in contact with any oil on the outside of the boot, the oil will roll under the contact surface of the washer and by the compressed edge 28 of the washer and prevent the lubricant portions from rolling in the opposite direction or passing beneath the washer.

The cork washer 23 is not only pressed against the sleeve 11 by means of the ring 25 and against the conical portion 22 of the plate 20 by the fit of the cylindrical part 21 on the sleeve 11 and the fit of the ring 25 on the sleeve 11, but also by means of the compression spring 31 which is located between the head 32 of the universal joint and the ring 25. The spring 31 operates to press the cork washer against the conical surface 22 which directs a component of the force towards the sleeve 11. The spring also operates to maintain the ring and washer in position.

The annular plate 20 is also provided with a cork washer 33 that has a plane surface 34 located at right angles to the axis of the sleeve 11 and consequently has an acute angle to the substantially spherical surface of the end of the boot, and consequently as the sleeve 11 moves angularly with respect to the boot, the inside corners of the washer 33 scrapes the grease or oil inward. Also the washer 33 has the substantially conical surface 36. The side of the conical surface 36 makes a sharper angle with plane surface 34 of the washer 33 than the spherical surface of the end of the boot at the point of contact with the outer corner of the inner side of the washer so that when the plate 20 is forced in position in the boot and the position is maintained by the spring 31, the corner 37 of the washer 33 is compressed more than the remainder of the sealing contact surface 36 of the washer 33. This is indicated in Fig. 4 where the dotted line 39 indicates the end of the boot. This operates in the same manner that the compressed corner 28 of the washer 23, namely, it permits oil or grease to "roll" between the surface 36 of the washer 33 and the inner substantially spherical surface of the boot, but on return movement of that portion of the washer the lubricant will be scraped into the boot. This prevents the lubricant from passing by the washer.

The washer 33 is held in position by means of the metal flanged ring 40. The plate 20 has a cylindrical surface 41 and a laterally extending flange 42. The washer 33 is located on the flange 42 and is made to substantially fit the cylindrical surface 41. The flange ring is forced over the cylindrical surface 41 and in so doing it forces the washer 33 outward. The flange of the ring 40 engages the washer 33 and clamps it against the flanges 42 and thus holds the washer 33 in position.

If desired the inner end of the boot may also be closed by a cap 45 whereby disconnection may be made with the driving shaft without disturbing the lubricant within the boot. The cap 45 may be provided with a flange 46 that fits the inner surface of the boot. The fit between the cap and the inner surface of the boot may be sufficiently tight to require a considerable force to drive it into position.

I claim:

1. In a universal joint boot seal having a substantially spherical outer end portion, the said portion having an opening through which a shaft extends, an annular closure plate located substantially within the said spherical portion, the closure plate having a pair of cork washers disposed at the inner and outer edges of the plate, one of said washers having a surface that normally extends at an acute angle to the inner surface of the spherical portion and the other of the said washers normally having a surface that extends at an acute angle to the surface of the shaft, means for pressing the plate outward to cause one cork surface to conform to the inner spherical surface of the said portion and the other of the said cork surfaces to conform to the exterior cylindrical surface of the shaft and to compress one of the edges of each of the cork surfaces to a greater degree than the other edges of their associated cork surfaces.

2. In a lubricant seal between two relatively movable members for preventing movement of a lubricant from between the members, one of the members having a lubricant confining part and the other member having a cork body, the cork body having a surface in contact with the surface of the member other than the one to which the cork body is connected, means for pressing the cork surface against the said surface of the member to produce a decreasing pressure progressively from point to point beginning at the edge on the side of the cork that the lubricant is located on, so as to produce a greater pressure per unit area at one edge portion of the surface of the cork than is produced at the other edge portion.

3. In a lubricant seal between two relatively movable members to prevent movement of a lubricant from between the members, one of the members having a lubricant confining part, and the other member having a body formed of cork, the cork having a surface normally located at an acute angle to the surface of one of the members, means interconnecting the other member and the cork for pressing the cork member against the surface of the other member to force such inclined surfaces into conformation of the surface of the member that the cork is normally inclined to and so as to produce a higher pressure at the angle and decreasing progressively along the contacting surfaces to the opposite edge, the edge having the higher pressure being located on the side of the lubricant that is to be sealed.

4. In a universal joint boot seal, a boot having an opening through which the shaft extends, an annular closure plate located within the boot and surrounding the shaft, the closure plate having a cork washer disposed at the inner edge of the plate, the said washer having a surface that normally extends at an acute angle to the surface of the shaft, means for pressing the cork washer towards the surface of the shaft to press the said surface of the cork washer against the surface of the shaft to cause the said surface of the cork to conform to the cylindrical surface of the said shaft and to compress one of the edges of the surface of the cork to a greater degree than the other edge of the cork surface.

5. In a universal joint boot seal, a boot having an opening through which a shaft extends, an annular closure plate located on the inside of the boot, the closure plate having an outer cylindrical surface disposed in spaced relation with respect to the cylindrical surface of the shaft and a laterally extending flange, a cork washer disposed on the laterally extending flange of the closure plate, a flanged ring fitting the cylindrical surface of the closure plate, the flange of the ring pressed against the side of the washer to clamp the washer between the flange of the ring and the flange of the closure plate.

6. In a universal joint boot seal, a boot having an opening through which a shaft extends, an annular closure plate located on the inside of the boot, the closure plate having a substantially conical inner surface, a washer located in contact with the substantially conical surface and in contact with the shaft, a flanged ring, the edge of the ring surrounding the shaft, the flange of the ring pressed against a side of the washer to clamp the washer against the shaft.

7. In a universal joint boot seal, a boot having an opening through which a shaft extends, an annular closure plate located on the inside of the boot, the closure plate having an outer cylindrical surface disposed in spaced relation with respect to the cylindrical surface of the shaft and a laterally extending flange, a pair of washers, one disposed on the shaft and the other on the laterally extending flange of the closure plate, a pair of flanged rings, the flanges of the rings pressing sides of the washers, one surrounding the shaft and its flange operating to press its associated washer against the shaft and the other fitting the cylindrical surface of the closure plate and its flange operating to clamp the washer against the laterally extending flange.

8. In a universal joint boot seal having a substantially spherical outer end portion, the said portion having an opening through which a shaft extends, an annular closure plate located substantially within the said spherical portion, the closure plate having a pair of gaskets disposed at the inner and outer edges of the plate, one of the said gaskets having a surface that normally extends at an acute angle to the inner surface of the spherical portion, and the other of the said gaskets having a surface normally extending at an acute angle to the surface of the shaft, means for pressing the plate outward to cause one of the said surfaces of one of the gaskets to conform to the inner surface of the said spherical portion and the other of the said surfaces of the other gasket to conform to the cylindrical surface of the shaft to compress one of the edges of each of the said surfaces of the gaskets to a greater degree than the other edges of the said surfaces of the said gaskets.

9. In a universal joint boot seal, a boot having an opening through which the shaft extends, an annular closure plate located within the boot and surrounding the shaft, a closure plate having a gasket disposed at the inner edge of the plate, the said gasket having a surface that normally extends at an acute angle to the surface of the shaft, means for pressing the gasket towards the surface of the shaft to cause the said surface of the gasket to conform to the cylindrical surface of the said shaft and to compress one of the edges of the surface of the gasket to a greater degree than the other edge of the surface of the gasket.

10. In a universal joint boot seal, a boot having an opening through which a shaft extends, an annular closure plate located on the inside of the boot, a gasket disposed at the edge of the closure plate, a flanged ring fitted within the gasket and fitting the surface of the closure plate, the flange of the ring pressed against the side of the gasket to clamp the gasket between the flange of the ring and the edge of the closure plate.

In testimony whereof I have hereunto signed my name to this specification.

BERTIS H. URSCHEL.